B. B. MONROE.
Wagon-Brake.
No. 66,866
Patented July 16, 1867.
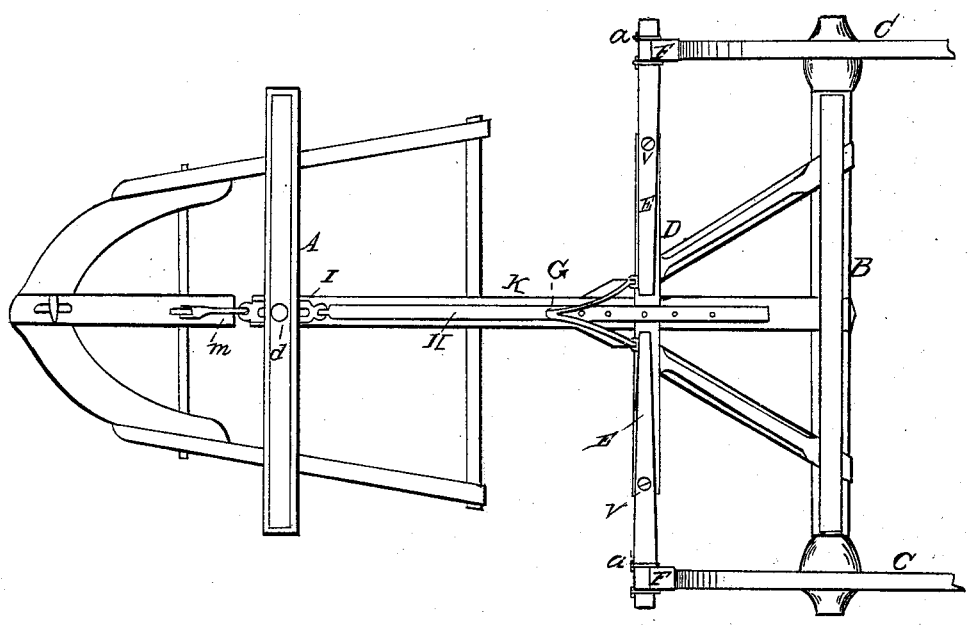
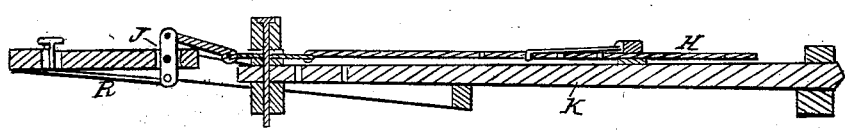
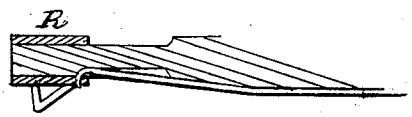
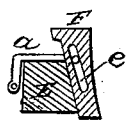

United States Patent Office.

BENJAMIN B. MONROE, OF JACKSON, MICHIGAN.

Letters Patent No. 66,866, dated July 16, 1867.

IMPROVEMENT IN WAGON-BRAKES.

The Schedule referred to in these Letters Patent and making part of the same.

TO ALL WHOM IT MAY CONCERN:

Be it known that I, B. B. MONROE, of Jackson City, in the county of Jackson, and in the State of Michigan, have invented certain new and useful improvements in Wagon-Brake; and do hereby declare that the following is a full, clear, and exact description thereof, reference being had to the accompanying drawings, and to the letters of reference marked thereon.

In the annexed drawings, making part of this specification, A and B represent the axles of the wagon, which are provided with the usual hounds, constructed in any of the known ways. C C represent the hind wheels. Lying across the hind hounds and perch-pole K is a bar, D, which has pivoted upon its upper side two brake-bars, E E. On the outer extremities of each are secured two brake-blocks, F. The brake-blocks are provided with slots e, through which loops or bails a a pass, to secure them to the brake-bars, said bails being secured to the front sides of the bars. The blocks are allowed to rise and fall, the bails or loops playing in the slots e, and also to turn over to the other or front side of the bars E E. G represents a rod with a forked rear end, the ends of said forks being hooked to catch into eyes on the inner ends of the bars E. The forward end of the bar G is also hooked so as to catch in a hole in a metallic bar, H, which lies upon the perch-pole. The bar H is graduated with a series of holes, to admit of the perch-poles being lengthened or shortened, as may be desirable. I represents a long link, with eyes in both ends. This link lies upon the bed-piece of the front axle, between it and its bolster, and the king-bolt passes through it. The bar H has a hook, which catches into the eye at the rear end of the link, and a hooked rod, m, catches into the eye in its forward end. The rod m is connected at its forward end to the upper end of a lever, J, which said lever stands in a vertical position, being pivoted in a slot in the rear end of the tongue. A rod, k, connects to the lower end of lever J, and then runs forward and attaches to a sleeve on the forward end of the pole. When the horses of the vehicle hold back, the neck-yoke acts against the sleeve R, and through said sleeve, which slides backward on the pole, upon rod k, lever J, rod m, link I, and bar H, and through said bar on rod G, and the brake-bars E, and blocks F, thrusting said blocks against the hind wheels, and thus impeding their motion.

Having thus fully described my invention, what I claim as new, and desire to secure by Letters Patent, is—

The slotted blocks F F, connected to the bars E by the bails a a, when arranged with the bar H and rod G, and operating in the manner substantially as and for the purposes specified.

In testimony that I claim the foregoing I have hereunto set my hand and seal this 21st day of February, 1867.

BENJAMIN B. MONROE. [L. S.]

Witnesses:
   JAS. A. DYER,
   J. B. TOMLINSON.